US011371324B2

(12) United States Patent
Badeghaish et al.

(10) Patent No.: US 11,371,324 B2
(45) Date of Patent: Jun. 28, 2022

(54) METHOD AND APPARATUS FOR INSTALLING INFIELD FLEXIBLE LINER OF DOWNHOLE TUBING

(71) Applicant: SAUDI ARABIAN OIL COMPANY, Dhahran (SA)

(72) Inventors: Wael O. Badeghaish, Khobar (SA); Mohamed N. Noui-Mehidi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/931,238

(22) Filed: Jul. 16, 2020

(65) Prior Publication Data
US 2022/0018223 A1 Jan. 20, 2022

(51) Int. Cl.
*E21B 43/10* (2006.01)
*E21B 17/10* (2006.01)
*F16L 55/165* (2006.01)

(52) U.S. Cl.
CPC .......... *E21B 43/10* (2013.01); *E21B 17/1085* (2013.01); *F16L 55/1656* (2013.01)

(58) Field of Classification Search
CPC ... E21B 43/10; E21B 17/1085; F16L 55/1656
See application file for complete search history.

(56) References Cited

U.S. PATENT DOCUMENTS

| 4,998,871 A | 3/1991 | Ledoux |
| 5,077,107 A | 12/1991 | Kaneda et al. |

(Continued)

FOREIGN PATENT DOCUMENTS

| EP | 1798370 A1 | 6/2007 |
| WO | 2000015411 A1 | 3/2000 |

(Continued)

OTHER PUBLICATIONS

"InField Liner: Flexible Kevlar Reinforced PVDF Liner—Revolutionary Subsea Pipeline Rehabilitation System", Product Brochure, IFL Technology in Line, APS, Access Date: Jul. 15, 2020, URL: <http://www.aps-corporate.com/download/erp/InField%20Liner%20IFL.pdf> (4 pages).

(Continued)

*Primary Examiner* — Taras P Bemko
(74) *Attorney, Agent, or Firm* — Osha Bergman Watanabe & Burton LLP

(57) ABSTRACT

A method of lining a tube using a spoolable liner includes connecting a connector to a distal end of the spoolable liner. The connector and spoolable liner are inserted into the tube and are advanced to a tube engagement point. A distal connection is formed between the spoolable liner and the tube by attaching the connector to an engagement mechanism at the tube engagement point. A proximal end of the spoolable liner is established and a proximal connection is formed between the proximal end and the tube. The spoolable liner is plugged with a deployable plug in a vicinity of the distal end and with a termination in a vicinity of the proximal end. An interior area is filled with a fluid such that the fluid expands the spoolable liner against an interior wall of the tube.

20 Claims, 13 Drawing Sheets

(56) References Cited

U.S. PATENT DOCUMENTS

| | | | |
|---|---|---|---|
| 5,205,886 A | 4/1993 | White | |
| 5,320,388 A | 6/1994 | Lacy et al. | |
| 5,395,472 A | 3/1995 | Mandich | |
| 5,443,099 A | 8/1995 | Chaussepied et al. | |
| 5,803,666 A * | 9/1998 | Keller | E21B 7/30 405/184.2 |
| 5,921,285 A | 7/1999 | Quigley et al. | |
| 6,024,910 A | 2/2000 | Kamiyama et al. | |
| 6,302,983 B1 | 10/2001 | Agren et al. | |
| 7,281,422 B2 * | 10/2007 | Keller | E21B 43/103 166/250.03 |
| 9,534,477 B2 * | 1/2017 | Keller | E21B 43/103 |
| 9,851,042 B2 | 12/2017 | Daveloose et al. | |
| 9,890,880 B2 | 2/2018 | Allin | |
| 2005/0229991 A1 | 10/2005 | Hardy et al. | |
| 2009/0101345 A1 * | 4/2009 | Moffitt | E21B 7/20 166/285 |
| 2012/0173148 A1 * | 7/2012 | Keller | E21B 47/10 702/11 |
| 2018/0231168 A1 * | 8/2018 | Barnes | G01M 3/2815 |
| 2020/0103065 A1 | 4/2020 | Decker et al. | |
| 2021/0088171 A1 * | 3/2021 | Kriesels | F16L 9/147 |

FOREIGN PATENT DOCUMENTS

| | | | |
|---|---|---|---|
| WO | 2002001103 A1 | 1/2002 | |
| WO | WO-2019137903 A1 * | 7/2019 | F16L 9/147 |

OTHER PUBLICATIONS

Dawson, Donna, "Composites extend service of corrosion-prone oil and gas pipelines: Corrosion-resistant aramid fiber/thermoplastic liner gives new life to deteriorating steel subsea pipelines." Inside Manufacturing, CompositesWorld.com, Aug. 2015, pp. 50-55 (6 pages).

Messina, N. et al., "Internal Lining of Carbon Steel Flowlines With a Plastic Liner Based on a Fluorinated Polymer Introduction of the Concept and Evidences on CAPEX and OPEX Reductions", OTC-26150-MS, Offshore Technology Conference, Oct. 2015 (25 pages).

Adhiyat, F. et al., "Study of Subsea Pipeline Rehabilitation Strategy in Mature Field by Using Infield Liner Method For CAPEX and OPEX Optimisation", Pipeline Technology Conference, May 2017 (12 pages).

International Search Report and Written Opinion issued in Application No. PCT/US2020/046941, dated Apr. 9, 2021 (11 pages).

* cited by examiner

METHOD AND APPARATUS FOR INSTALLING INFIELD FLEXIBLE LINER OF DOWNHOLE TUBING

BACKGROUND

Tubulars are installed in wells to provide a conduit from the well to the surface and to support the wall of the well. However, once the well starts producing water, corrosion of these tubulars becomes a concern. In order to prevent corrosion of well tubulars, several methods are used, such as injecting chemical inhibitors into the well, lining the tubulars with protective coatings, and lining the tubulars with high grade alloys such as chromium or nickel based alloys. However, these methods are either inefficient or relatively expensive in terms of cost and logistics.

SUMMARY

Some embodiments describe a method of lining a tube using a spoolable liner. That method may include: connecting a connector to a distal end of the spoolable liner; inserting the connector and spoolable liner into the tube and advancing the connector to a tube engagement point at an interior of the tube; forming a distal connection between the spoolable liner and the tube by attaching the connector to an engagement mechanism at the tube engagement point; establishing a proximal end of the spoolable liner; forming a proximal connection between the proximal end of the spoolable liner and the tube; plugging the spoolable liner with a deployable plug in a vicinity of the distal end; plugging the spoolable liner with a termination in a vicinity of the proximal end; and filling an interior area defined by an interior of the spoolable liner, the termination, and the deployable plug with a fluid such that the fluid expands the spoolable liner against an interior wall of the tube.

In some embodiments, the spoolable liner may be liquid impermeable such that the spoolable liner corrosion protects the interior wall of the tube between the distal connection and the proximal connection.

Some embodiments of the method also may include removing the deployable plug and the termination; and causing production to flow through the interior of the spoolable liner.

Some embodiments of the method also may include removably connecting a conveyance device to the connector; using the conveyance device to advance the spoolable liner to the tube engagement point; releasing the conveyance device from the connector after the connector has been connected to the engagement mechanism; and removing the conveyance device from the tube.

In some embodiments, the conveyance device may be a tractor.

Some embodiments of the method also may include leak-testing the spoolable liner, the distal connection, and the proximal connection by flowing a testing fluid through the interior of the spoolable liner.

In some embodiments, forming the proximal end of the spoolable liner may include cutting the spoolable liner in a vicinity of a proximal section of the tube.

In some embodiments, forming the proximal connection may include clamping the proximal end of the spoolable liner to a vicinity of the proximal section of the tube with a termination collar.

In some embodiments, the fluid may be at least one of air, nitrogen, oxygen, and argon.

In some embodiments, the deployable plug may be a removable stopper. In some embodiments, plugging the spoolable liner in the vicinity of the distal end may include: inserting the removable stopper into the spoolable liner within the tube; and disposing the removable stopper in a vicinity of the distal end.

Some embodiments describe a system for lining a tube. In some embodiments, the system may include: a hollow, flexible, spoolable liner having a distal end; a connector configured to be attached to the distal end of the spoolable liner and to engage with an engagement mechanism at a tube engagement point at an interior of the tube forming a distal connection; a deployable plug sized to seal the spoolable liner in a vicinity of the distal end; a termination sized to seal in a vicinity of a proximal end of the spoolable liner and configured to secure the proximal end of the spoolable liner to a proximal section of the tube forming a proximal connection, wherein the termination may include an aperture providing fluidic connection to an interior area defined by an interior of the spoolable tube, the deployable plug, and the termination; and a fluid source selectively engageable with the interior area via the aperture of the termination to expand the interior of the spoolable liner against an interior wall of the tube.

In some embodiments, the spoolable liner may be liquid impermeable such that the spoolable liner corrosion protects the interior wall of the tube between the distal connection and the proximal connection.

In some embodiments, the spoolable liner may include an inner liner, a core, and an outer layer. In some embodiments, the inner liner may be at least one of polyvinylidene fluoride, polyvinylidene difluoride, and polyetheretherketone; the core may be tightly woven aramid fibers; the outer layer may be a thermoplastic polyurethane.

In some embodiments, the engagement mechanism may be a landing nipple.

In some embodiments, the connector may be a mandrel.

In some embodiments, the deployable plug may be a removable stopper.

In some embodiments, the termination may include a termination body and an orifice defined in the termination body for fluidly attaching a pump to the interior area.

In some embodiments, the proximal end of the spoolable liner may be attached in a vicinity of the proximal section of the tube by a termination collar.

Other aspects and advantages of the invention will be apparent from the following description and the appended claims.

DETAILED DESCRIPTION

Figure 1:
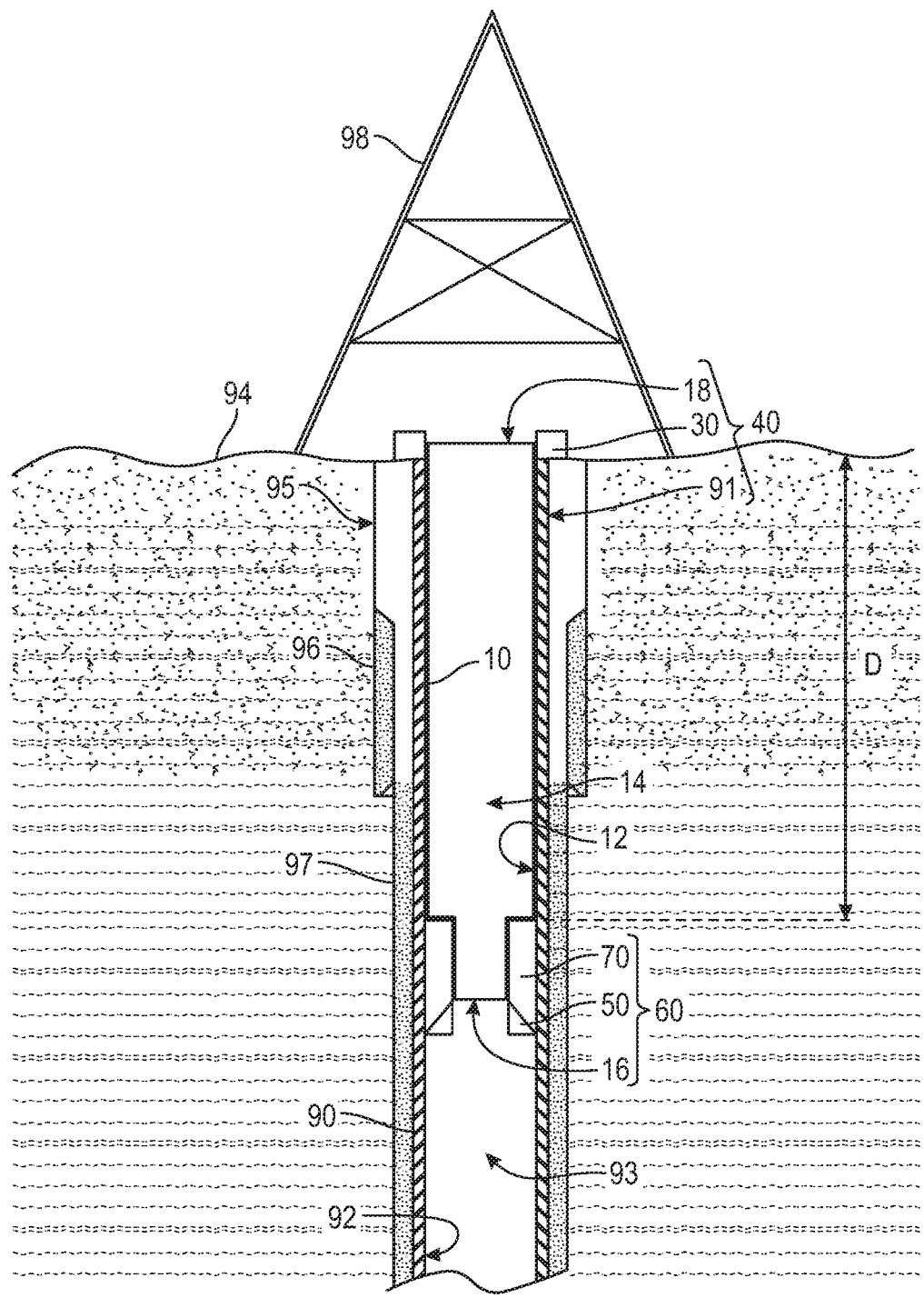
FIG. 1 depicts a schematic of an embodiment of a tube in a well lined by a spoolable liner.

FIG. 1 shows an oil derrick 98 on a surface 94 atop a well 95. Well 95 includes casings 96, 97. Within inner casing 97 is a tube 90. Tube 90 may be an innermost casing, in some embodiments. Tube 90 includes an inner wall 92 of tube 90. Also, tube 90 defines an interior 93 of tube 90 that extends from surface 94 to some terminus, such as the end of well 95 within a formation. Furthermore, a portion of tube 90 is lined with a spoolable liner 10.

Tube 90 may have one or more engagement mechanisms installed during completion of well 95, for example at regular intervals along tube 90. These engagement mechanisms allow for various components (such as plugs, chokes, sensors, and others) to be removably installed within tube 90 after completion of well 95. In some instances, one or more engagement mechanism may be a landing nipple 70.

Landing nipple 70 is located within tube 90 at a tube engagement point. Here, tube engagement point is a tube engagement depth D. One having skill in the art will appreciate that well 95 may not be vertical, and thus tube engagement depth D may include non-vertical lengths. Since, landing nipple 70 may be placed in tube 90 during completion of well 95, placement of landing nipple 70 may occur in advance (potentially well in advance) of the lining tube 90 as described here.

Additionally, while tube 90 may include multiple landing nipples along the length, only landing nipple 70 is located at tube engagement depth D. To that end, additional landing nipples in tube 90 may be located upflow, downflow, or both of landing nipple 70.

In some embodiments, landing nipple 70 may be any type of landing nipple, including a no-go nipple, a selective-landing nipple, a ported nipple, or a safety-valve nipple. In some embodiments, the engagement mechanism may be a collar (the space between the two tubing joints with accessible, conventional thread connections) or interior wall 92 of tube 90. In some embodiments, the engagement mechanism may be any other engagement mechanism that may be included in tube 90 known in the art.

The engagement mechanism may have an interlocking confirmation with a connector. To that end, mandrel 50 and landing nipple 70 as depicted in FIG. 1 have interlocking confirmations.

In one or more embodiments, the connector may be a mandrel 50, such as a lock mandrel (or locking mandrel), a slick lock, or a collar lock. In some embodiments, the connector may be any other connector known in the art that is designed to interface with a known engagement mechanism included in tube 90.

One having skill in the art will appreciate alternative embodiments for the engagement mechanism/connector pair that may be used to connect various components to tube 90 after completion of well 95. In some embodiments, the engagement mechanism may be landing nipple 70 and the connector may be mandrel 50 as depicted in FIG. 1. In some embodiments, the engagement mechanism may be a collar and the connector may be a collar lock. In some embodiments, the engagement mechanism may be interior wall 92 of tube 90 and the connector may be a slip lock.

In FIG. 1, tube 90 is lined with spoolable liner 10 between a proximal connection 40 to a distal connection 60. Distal connection 60 is located below surface 94, while proximal connection 40 is located in a vicinity of surface 94 in this embodiment. Spoolable liner 10 defines an interior 14 within an interior wall 12 of spoolable liner 10.

Distal connection 60 is formed between a distal end 16 of spoolable liner 10, the connector, and the engagement mechanism. In FIG. 1, the connector takes the form of mandrel 50 and the engagement mechanism takes the form of landing nipple 70. Thus, distal connection 60 includes distal end 16 of spoolable liner 10, mandrel 50, and landing nipple 70. As discussed previously, mandrel 50 and landing nipple 70 have a locking confirmation. Additionally, mandrel 50 is configured to connect to distal end 16 of spoolable liner 10.

Proximal connection 40 is formed between a proximal end 18 of spoolable liner 10, a proximal section 91 of tube 90, and a termination. Proximal section 91 of tube 90 is defined as the portion of tube 90 near where proximal connection 40 is to be formed. In FIG. 1, proximal section 91 of tube 90 is near surface 94.

In FIG. 1, the termination includes a termination collar 30. Termination collar 30 secures proximal end 18 of spoolable liner 10 to proximal section 91 tube 90. Securing proximal end 18 of spoolable liner 10 to termination collar 30 and termination collar 30 to proximal section 91 of tube 90 may be performed by any joining method known in the art, such as adhesive, clamping, or interlocking confirmation.

In one or more embodiments, the termination may be any direct or indirect connection between proximal end 18 of spoolable liner 10 and proximal section 91 of tube 90. In one or more embodiments, the termination may be a direct connection between proximal end 18 of spoolable liner 10 and proximal section 91 of tube 90. In one or more embodiments, the termination may be an indirect connection between proximal end 18 of spoolable liner 10 and proximal section 91 of tube 90, for example between proximal end 18 of spoolable liner 10 and surface 94 near tube 90 or between proximal end 18 of spoolable liner 10 and a wellhead (not depicted) atop tube 90. Proximal end 18 of spoolable liner 10 may be connected directly to tube 90 or to an intermediate component such as termination collar 30 (as in FIG. 1) by any joining method known in the art, such as adhesive clamping, or interlocking confirmation.

In one or more embodiments, termination collar 30 may clamp proximal end 18 of spoolable liner 10 to proximal section 91 of tube 90. In some embodiments, proximal connection 40 may be formed by cutting spoolable liner 10 in a vicinity of proximal section 91 of tube 90 to form proximal end 18 of spoolable liner 10; close fitting proximal end 18 of spoolable liner 10 to proximal section 91 of tube 90; and engaging termination collar 30 to clamp proximal end 18 of spoolable liner 10 to proximal section 91 of tube 90.

Between proximal connection 40 and distal connection 60, spoolable liner 10 is disposed against interior wall 92 of tube 90. In some embodiments, spoolable liner 10 may have a tight fit against interior wall 92 of tube 90 between proximal connection 40 and distal connection 60. Further, spoolable liner 10 may be radially disposed against additional engagement mechanisms upflow from landing nipple 70. Thus, in some embodiments, spoolable liner 10 may serve as a liner for tube 90 interior 93 between proximal connection 40 and distal connection 60.

Between proximal connection 40 and distal connection 60, fluids (like production fluid) flow through interior 14 of spoolable liner 10 within tube 90 instead of directly through interior 93 of tube 90. Therefore, these fluids does not contact interior wall 92 of tube 90 between proximal connection 40 and distal connection 60. Thus, interior wall 92 of tube 90 is corrosion protected from these fluids between proximal connection 40 and distal connection 60 by spoolable liner 10.

FIGS. 2-11 depict an embodiment of the method for lining tube 90 with spoolable liner 10 as depicted in the embodiment shown in FIG. 1.

Figure 2:
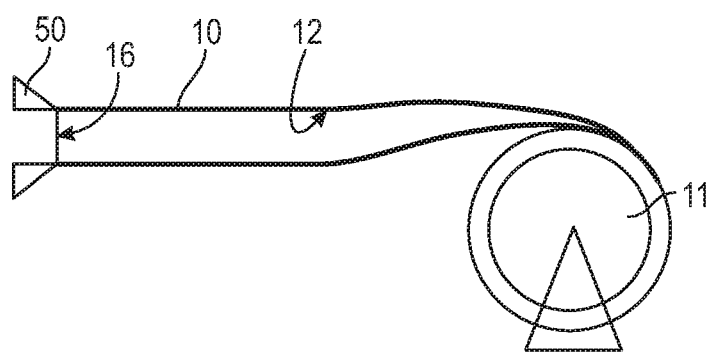
FIG. 2 depicts a schematic of an embodiment of a spoolable liner prepared to line a tube.

FIG. 2 shows spoolable liner 10 on a spool 11. Additionally, mandrel 50 is connected to distal end 16 of spoolable liner 10. This connection between mandrel 50 and distal end 16 of spoolable liner 10 may be formed by any joining method known in the art, such as adhesive, clamping, or interlocking confirmation.

Figure 3:
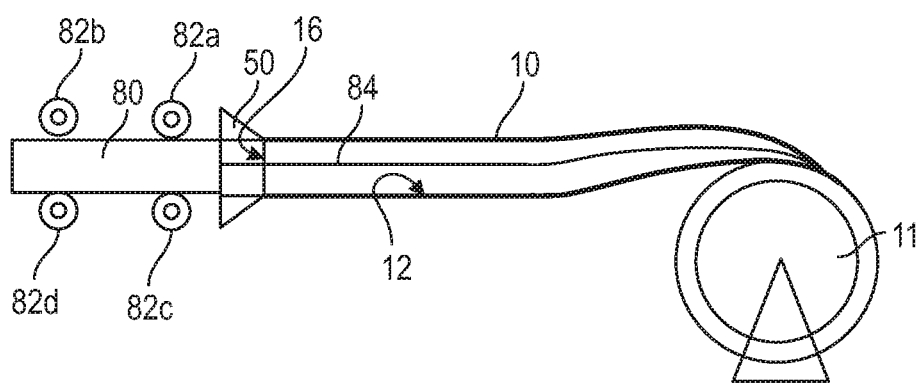
FIG. 3 depicts a schematic of an embodiment of a spoolable liner prepared to line a tube.

FIG. 3 depicts mandrel 50 and distal end 16 of spoolable liner 10 removably connected to a conveyance device. Here, the conveyance device includes a tractor 80 attached to a slickline 84. Slickline 84 is depicted as extending within interior wall 12 of spoolable liner 10, however in some embodiments, slickline 84 may not extend through spoolable liner 10. In some embodiments, the slickline 84 may extend inside of tube 90 and outside of spoolable liner 10.

The conveyance device in FIG. 3 is a tractor 80 with four wheels 82a, 82b, 82c, 82d on slickline 84. Tractor 80 may take any shape or form known in the art and may have any number and placement of wheels 82a, 82b, 82c, 82d. Tractor 80 may lack wheels in favor of another means of conveyance within tube 80. In some embodiments, the conveyance device may be a weight on a line, a robot, or any other means of conveying mandrel 50 within tube 90.

Figure 4:
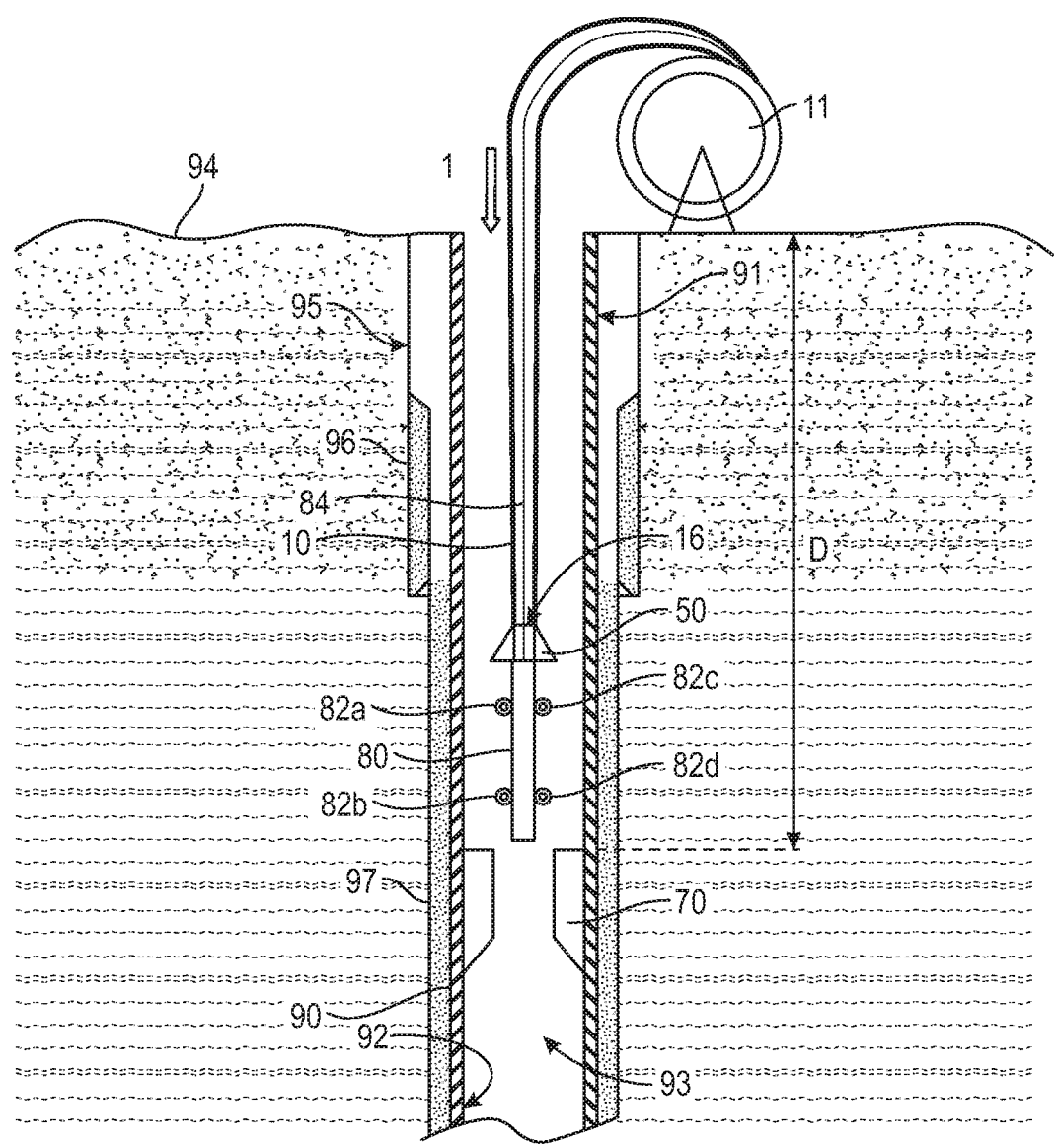
FIG. 4 depicts a schematic of an embodiment of a spoolable liner advanced into a tube.

In FIG. 4, tractor 80, mandrel 50, and distal end 16 of spoolable liner 10 have been inserted into tube 90 and are advancing down tube 90 as indicated by an arrow 1. Tractor 80 is still connected to mandrel 50 and distal end 16 of spoolable liner 10 as in FIG. 3.

Spoolable liner 10 extends between distal end 16 within interior 93 of tube 90 and onto spool 11. Spool 11 is located on surface 94 near proximal end 91 of tube 90. Thus, spoolable liner 10 extends between distal end 16 connected to mandrel 50 within tube 90 and spool 11 on surface 94.

Tractor 80 advances mandrel 50 and distal end 16 of spoolable liner 10 within interior 93 of tube 90. Tractor 80 advances mandrel 50 to landing nipple 70 at tube engagement depth D. Specifically, tractor 80 is directly advancing mandrel 50 and indirectly advancing distal end 16 of spoolable liner 10. As tractor 80 moves towards landing nipple 70, additional length of spoolable liner 10 is removed from spool 11.

Tractor 80 is physically connected via slickline 84 to an appropriate apparatus (not depicted) above surface 94. In some embodiments, the conveyance device may be physically connected to surface 94 by slickline 84, a wireline, or some other tether. In some embodiments, the conveyance device may not be physically connected to any structure out of tube 90.

Tractor 80 is also communicatively connected via slickline 84 to a controller (not depicted) above surface 94. This controller controls tractor 80, mandrel 50, and distal end 16 of spoolable liner 10 within tube 90. In some embodiments, this controller may be a computer. In some embodiments, the conveyance device may be remotely controlled by a controller (not depicted) via wire (for example, slickline 84) or wirelessly (for example, WiFi, Bluetooth, and other). One having skill in the art will appreciate how tractor 80 or other conveyance device may be remotely controlled by a controller.

Figure 5:
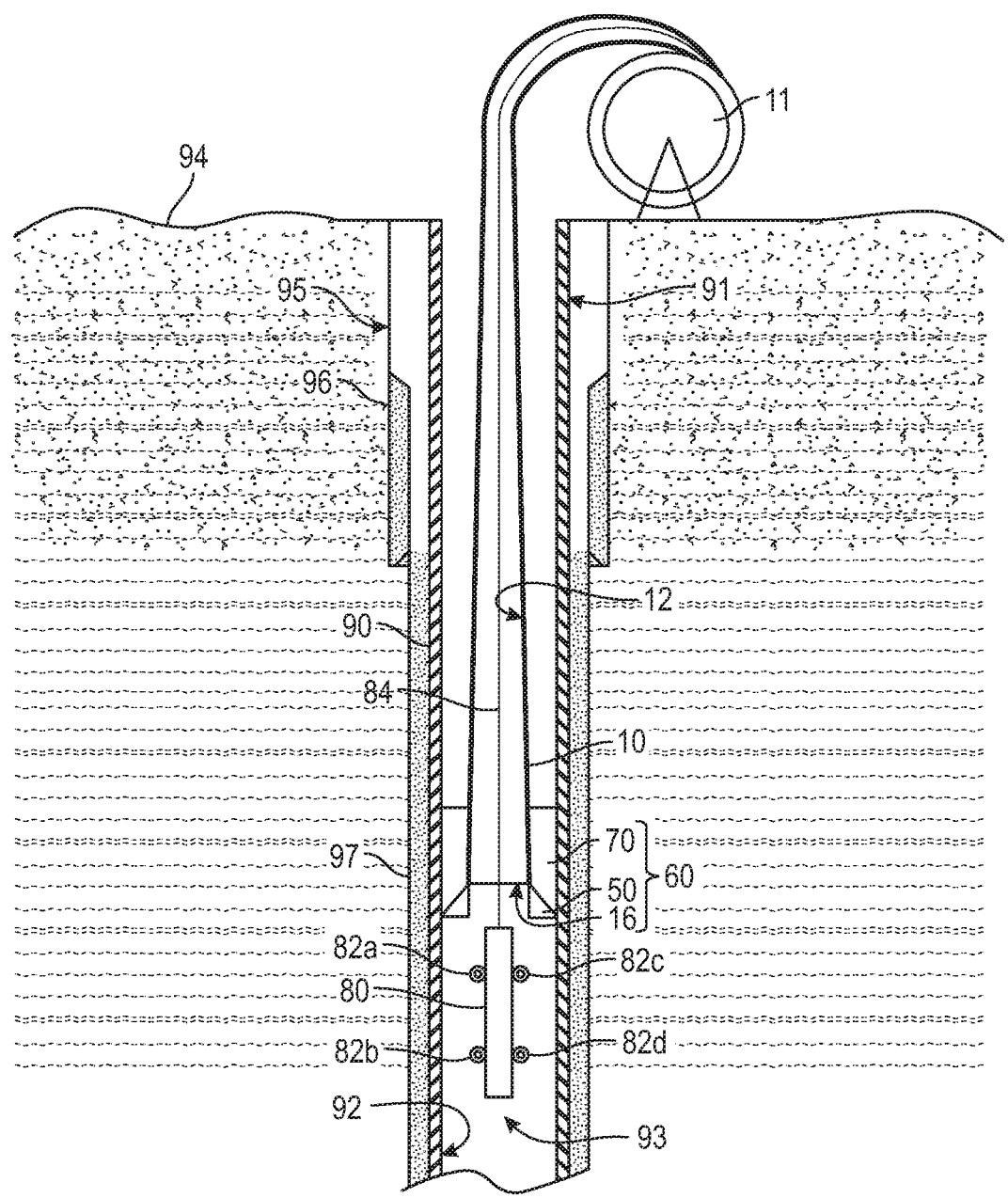
FIG. 5 depicts a schematic of an embodiment of a spoolable liner connected to a tube.

FIG. 5 depicts distal connection 60, which includes distal end 16 of spoolable liner 10, mandrel 50, and landing nipple 70 at interior 93 of tube 90.

Specifically, mandrel 50 is connected to landing nipple 70. Furthermore, as previously detailed, mandrel 50 is connected to distal end 16 of spoolable liner 10 and landing nipple 70 is located at interior 93 of tube 90. Thus, distal connection 60 indirectly connects distal end 16 of spoolable liner 10 to interior 93 of tube 90.

Mandrel 50 and landing nipple 70 are configured such that tractor 80 can remotely engage and attach mandrel 50 to landing nipple 70. As discussed previously, a controller (not depicted) located on surface 94 controls the actions and movement of tractor 80 via slickline 84. Thus, tractor 80 is used to attach mandrel 50 to landing nipple 70. One having skill in the art will appreciate the specific features and mechanisms of tractor 80, mandrel 50, and landing nipple 70 that allow mandrel 50 and landing nipple 70 to be remotely engaged and locked by tractor 80 within tube 90, potentially far below surface 94. Further, one of skill in the art will appreciate how tractor 80 may be remotely controlled by a controller to engage and attach mandrel 50 to landing nipple 70 within tube 90. In general, in some embodiments, the conveyance device may be capable of remotely engaging and joining the connector to the engagement mechanism.

Finally, once mandrel 50 and landing nipple 70 are connected, tractor 80 may be released from mandrel 50. Thus, tractor 80 is depicted suspended on slickline 84 slightly downflow from mandrel 50 and landing nipple 70, as may be the case after mandrel 50 and landing nipple 70 are connected.

Figure 6:
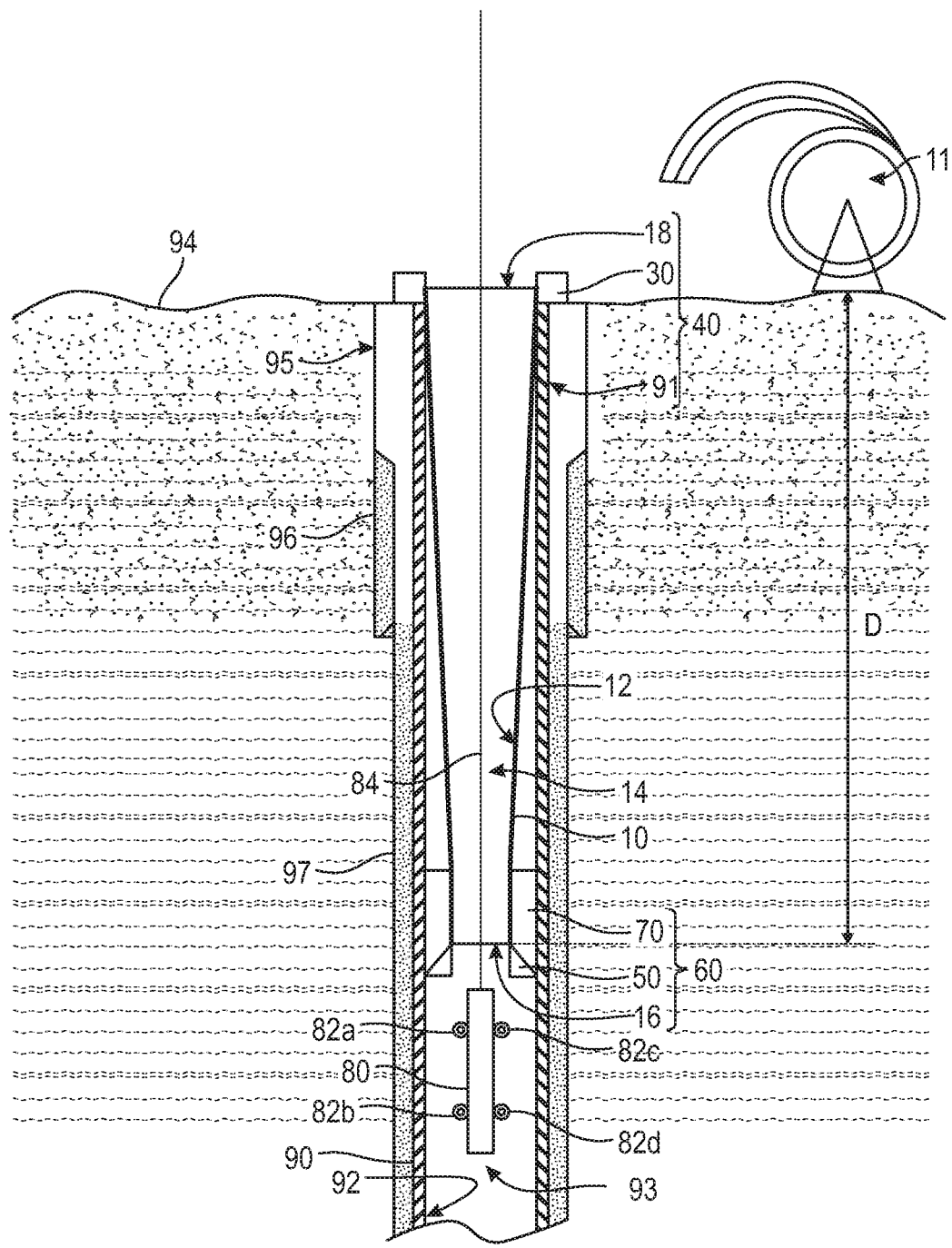
FIG. 6 depicts a schematic of an embodiment of a spoolable liner connected to a tube.

FIG. 6 depicts establishing proximal end 18 of spoolable liner 10 and forming proximal connection 40.

Proximal end 18 of spoolable liner 10 may be formed by cutting spoolable liner 10 in a vicinity of proximal section 91 of tube 90. This cutting may be performed using any method known in the art, including mechanical cutting, thermal cutting, or others.

In an alternative embodiment, the length of spoolable liner 10 on spool 11 may be particularly sized for a known tube engagement depth D. Thus, establishing proximal end 18 of spoolable liner 10 may involve removing proximal end 18 of spoolable liner 10 from spool 11.

After proximal end 18 of spoolable liner 10 is established, spool 11 may be moved away from tube 90. After being separated from spoolable liner 10 in tube 90, spool 11 and any unused spoolable liner material may be now be used in another location.

Proximal connection 40 is formed between proximal end 18 of spoolable liner 10, proximal section 91 of tube 90, and termination collar 30, as previously detailed. Thus, proximal connection 40 indirectly connects proximal end 18 of spoolable liner 10 to proximal section 91 of tube 90.

Figure 7:
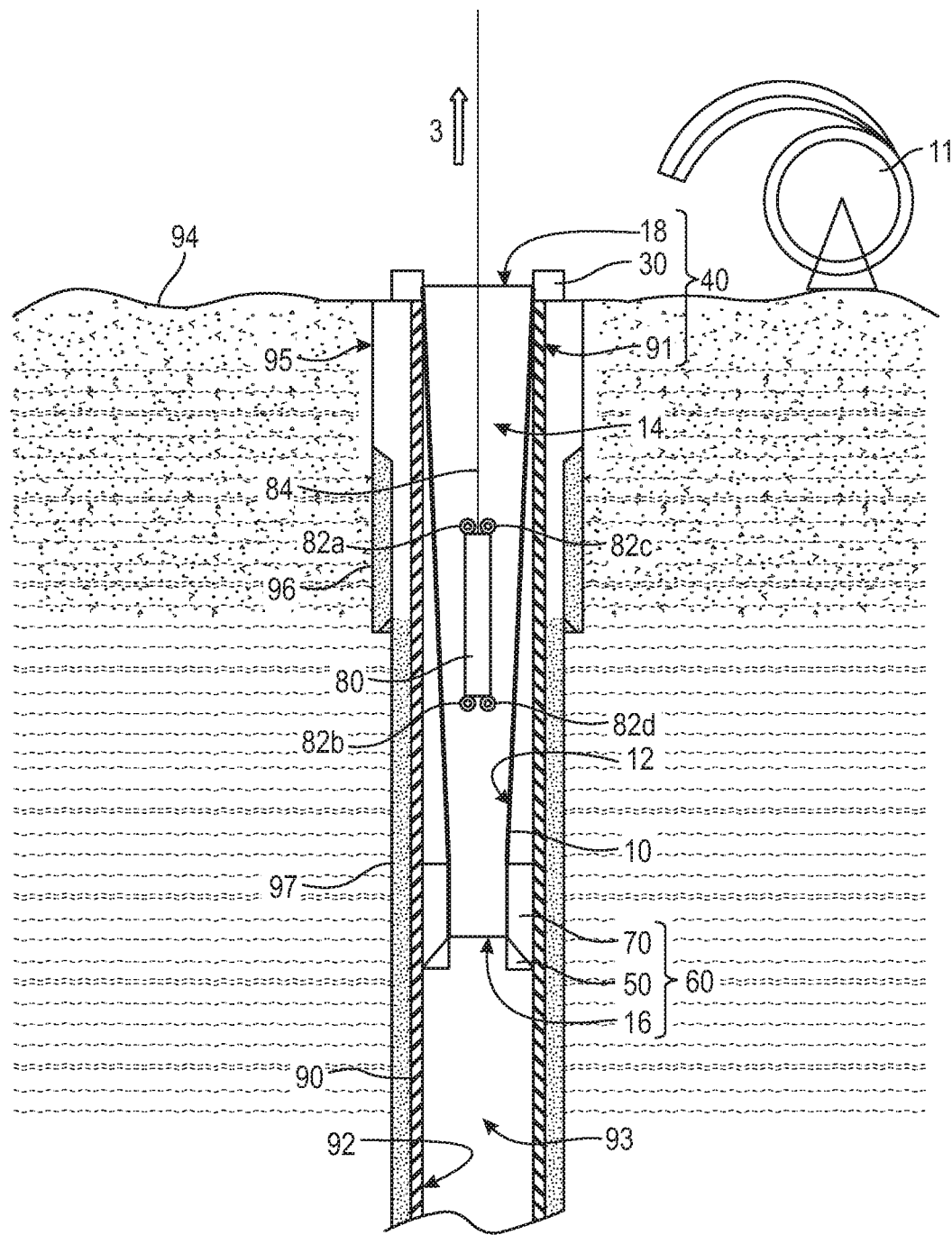
FIG. 7 depicts a schematic of an embodiment of a spoolable liner connected to a tube.

FIG. 7 shows tractor 80 being removed from tube 90 via slickline 84, as indicated with arrow 3. The removal of tractor 80 from tube 90 may be termed pull out of hole (POOH).

Additionally, wheels 82a, 82b, 82c, 82d are relocated on tractor 80. This relocation of wheels 82a, 82b, 82c, 82d around tractor 80 reduces the width of tractor 80 is reduced. Such mechanisms for streamlining tractor 80 for removal from tube 80 are well known in the art.

In some embodiments, the conveyance device may be removed from within tube 90 after the placement of the engagement mechanism such as via a line (such as by slickline 84 attached to tractor 80 or by a removable weight), by dissolving (as a dissolvable weight), or by any other means.

Figure 8:
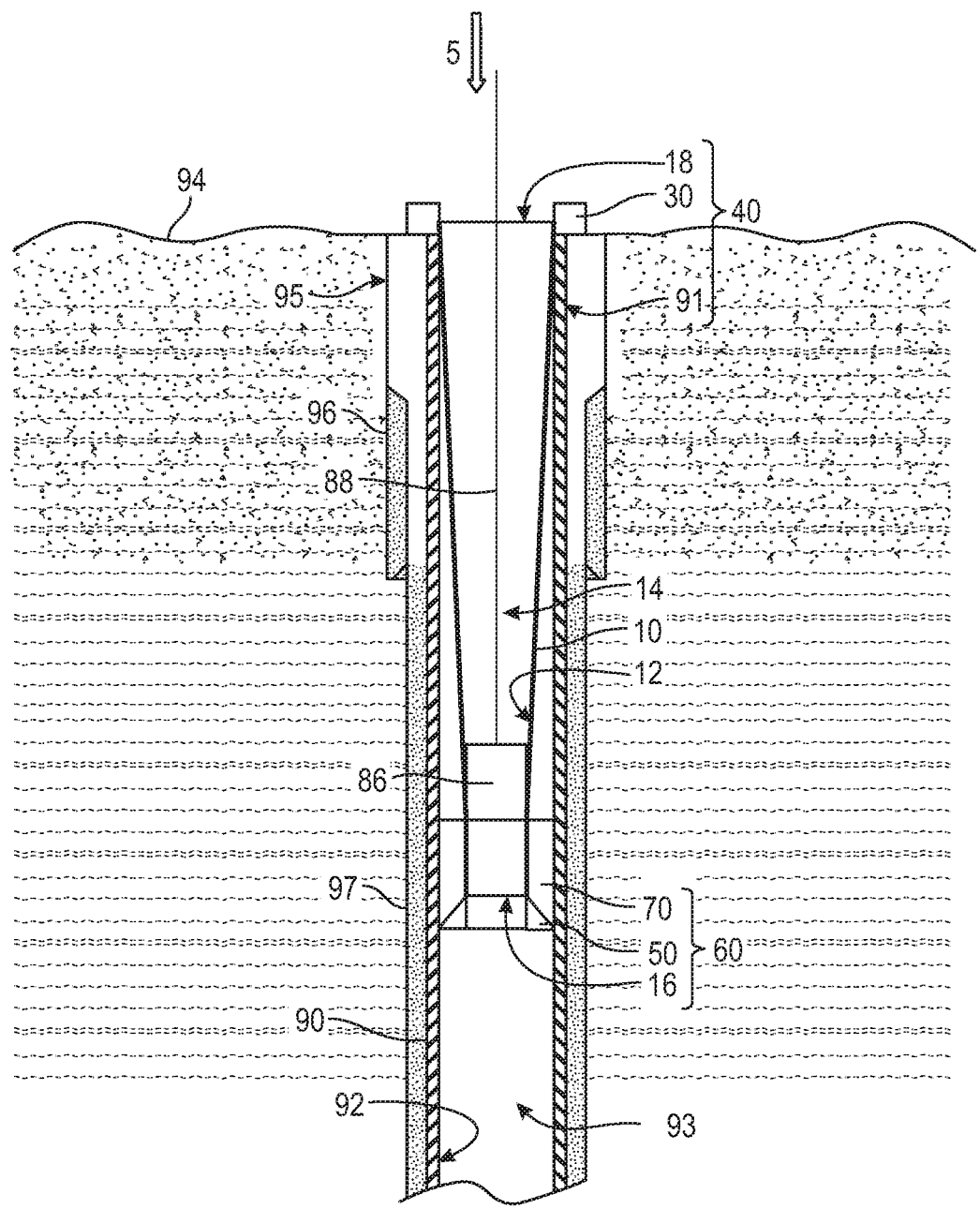
FIG. 8 depicts a schematic of an embodiment of a spoolable liner within a tube partially plugged.

FIG. 8 depicts interior 14 of spoolable liner 10 plugged with a deployable plug in a vicinity of distal end 16. In the depicted embodiment, the deployable plug has the form of a removable stopper 86. Arrow 5 depicts the direction a tether 88 is deployed to insert and place removable stopper 86 within spoolable liner 10.

Specifically, removable stopper 86 abuts landing nipple 70 within spoolable liner 10. Additionally, removable stopper 86 plugs interior 14 of spoolable liner 10 in the vicinity of distal end 16 of spoolable liner 10. To that end, removable stopper 86 is sized to seal distal end 16 of spoolable liner 10 at landing nipple 70.

Removable stopper 86 is attached to tether 88. In the depicted embodiment, removable stopper 86 is largely brought into position via gravity. Thus, tether 88 is used to control the descent and placement of removable stopper 86 within interior 14 of spoolable liner 10 from surface 94. Tether 88 may physically connect removable stopper 86 to an appropriate apparatus (not depicted) above surface 94. Further, in some embodiments, tether 88 may communicably connect removable stopper 86 to a controller (not depicted) above surface 94. In some embodiments, tether 88 may be a cable, a wireline, or a slickline. In some embodiments, deployable plug may be neither physically, communicably, nor both connected to apparatus(es) (not depicted) above surface 94.

As discussed previously, in some embodiments, tube 90 may include multiple landing nipples at various depths. Thus, removable stopper 86 may need to change shape or confirmation in order to be deployed past additional landing nipple(s) before reaching landing nipple 70. Upon nearing a vicinity of distal end 16 of spoolable liner 10, removable stopper 86 may be fully deployed. For example, removable stopper 86 may change shape by inflation or mechanically actuation when at a vicinity of distal end 16 of spoolable liner 10. Such change, in some embodiments, may be controlled via the controller (not depicted) located at surface 94 and communicably connected to removable stopper 86 via tether 88.

In some embodiments, removable stopper 86 may be deployed in any location in the vicinity of distal end 16 of spoolable liner 10, including proximate to, upflow, or downflow of landing nipple 70, mandrel 50, or both. Alternatively, removable stopper 86 may be deployed in any location downflow from landing nipple 70 and mandrel 50.

In some embodiments, removable stopper 86 may be moved to a vicinity of distal end 16 of spoolable liner 10 via conveyance device (like tractor 80) as opposed to a separate means (such as gravity). In some embodiments, the conveyance device may itself serve as the deployable plug. Alternative, in some embodiments, a conveyance device (such as tractor 80) may advance the deployable plug along with the connector (such as mandrel 50) and distal end 16 of spoolable liner 10. In such embodiments, the conveyance device (such as tractor 80) may not be separately withdrawn from tube 90 as depicted in FIG. 7, and instead may stay within tube 90 until the deployable plug is removed, as will be described further. In some embodiments, a conveyance device may be used twice. First, to advance and lock mandrel 50 to landing nipple 70 as discussed previously and, second, to advance and place removable stopper 86 in a vicinity of distal end 16 of spoolable liner 10.

Deployable plug may be formed of any substance that may be selectively deployable and removable. In some embodiments, deployable plug may not be a physical object such as removable stopper 86 that needs particular placement. Instead, in some embodiments, deployable plug may be an intentional clog formed by a chemical reaction or by a physical buildup. Furthermore deployable plug may be a feature within other downhole components, such as mandrel 50, landing nipple 70, or others.

Figure 9:
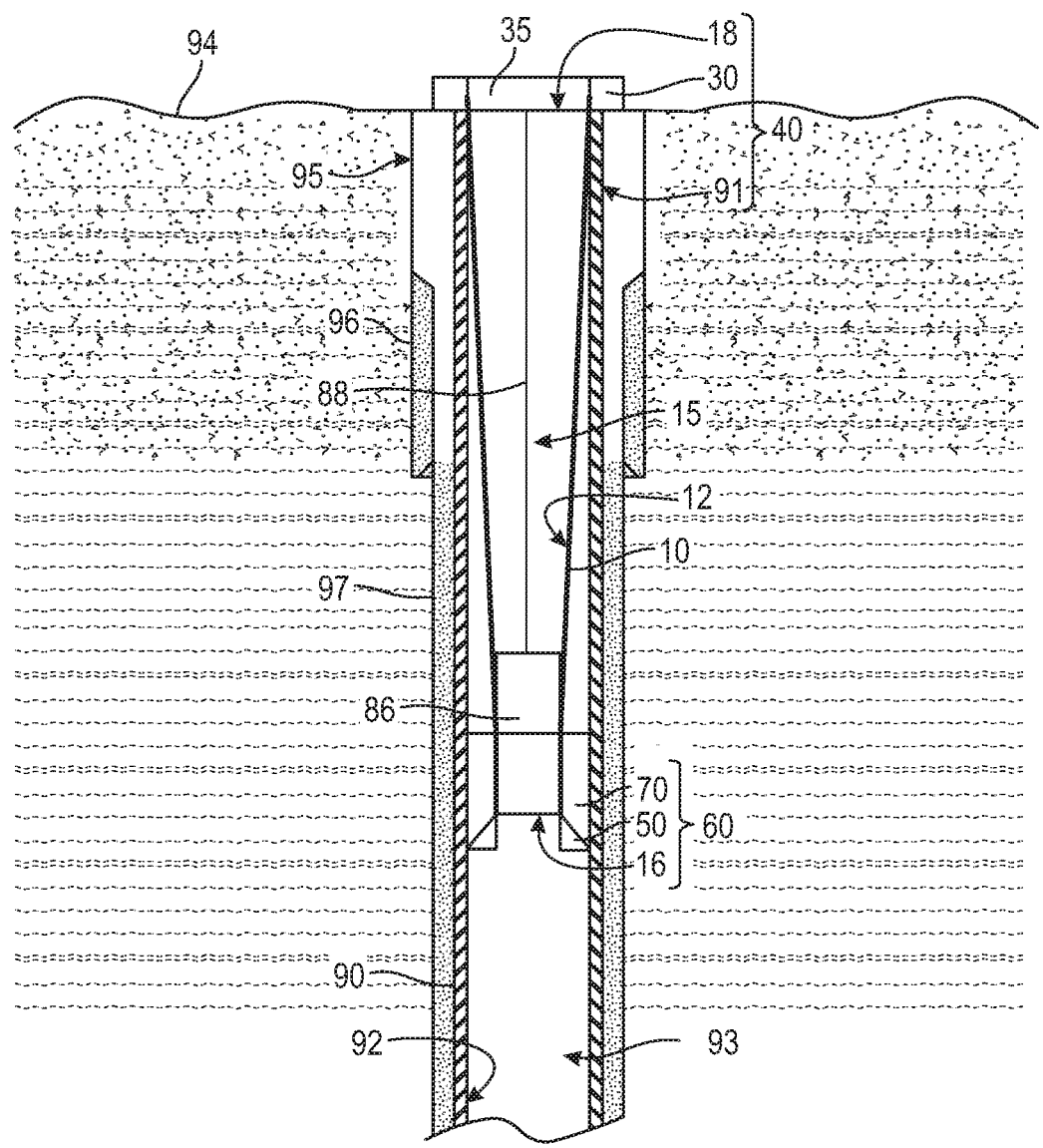
FIG. 9 depicts a schematic of an embodiment of a spoolable liner within a tube fully plugged.

FIG. 9 depicts interior 14 of spoolable liner 10 plugged in a vicinity of proximal end 18 with a termination. Thus, the termination is sized to seal spoolable liner 10 in a vicinity of proximal end 18.

In the depicted embodiment, the termination includes termination body 35 and termination gasket 30, where termination body 35 has a conformal shape to termination collar 30. Thus, in FIG. 9, together termination body 35 and termination collar 30 are configured to connect and sized to seal spoolable liner 10 in a vicinity of proximal end 18.

Figure 10:
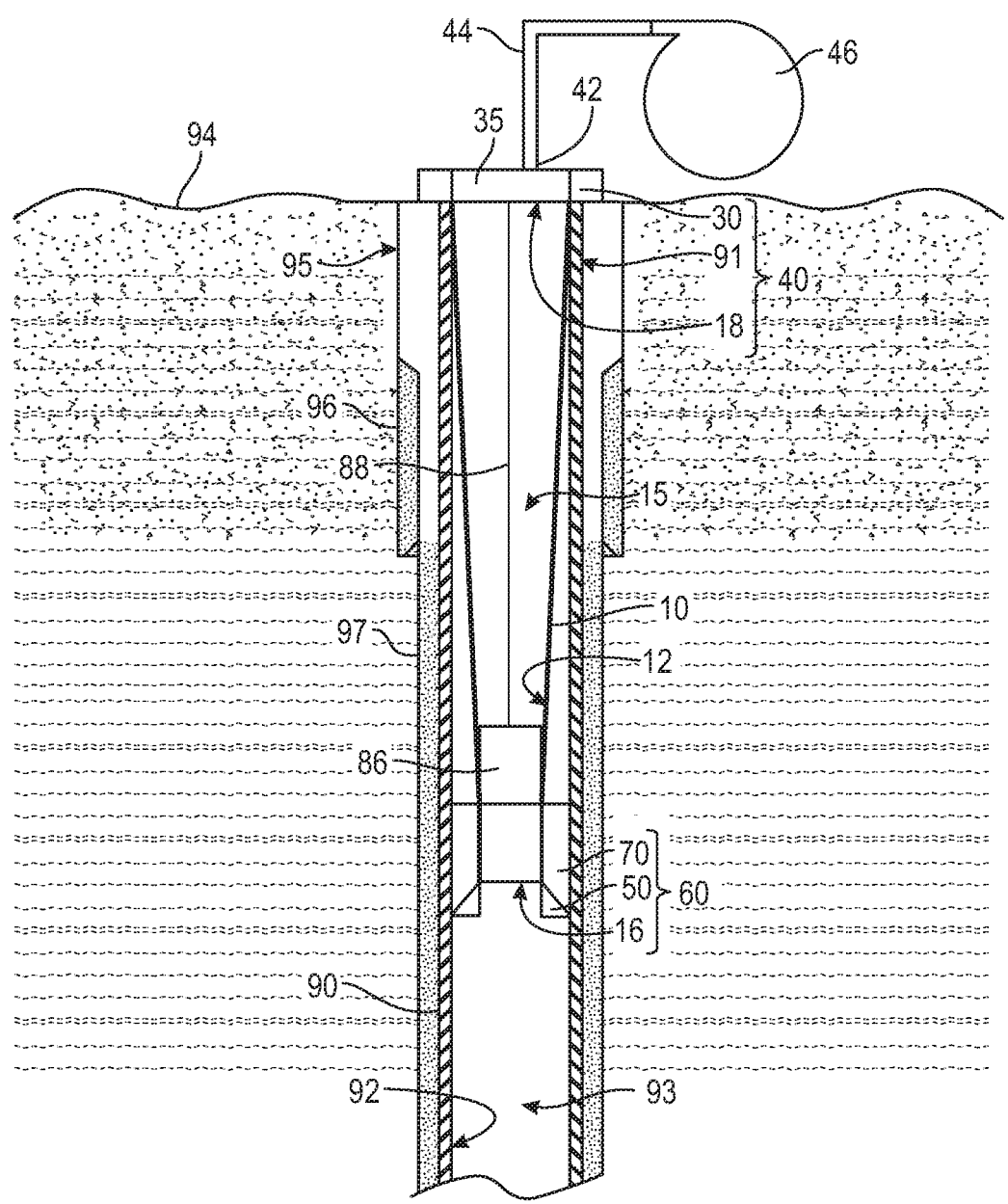
FIG. 10 depicts a schematic of an embodiment of a spoolable liner within a tube connected to a pump.

As in FIGS. 9 and 10, when spoolable liner 10 is plugged in a vicinity of both distal end 16 and proximal end 18, an interior area 15 is defined by interior wall 12 of spoolable liner 10, termination body 35, and removable stopper 86.

FIG. 10 depicts a pump 46 connected to interior area 15. Specifically, aperture 42 in termination body 35 provides fluidic connection into interior area 15. Thus, pump 46 is connected to interior area 15 of spoolable liner 10 via a hose 44 connected to an aperture 42 in termination body 35.

To that end, aperture 42 may be used to selectively employ a fluid source to fill interior area 15 with a fluid. In the depicted embodiment, pump 46 is the source of air that serves as a fluid to fill interior area 15. Pump 46 gathers air from the ambient environment via an intake vent and fills interior area 15 with that air.

In some embodiments, the fluid used to fill interior area 15 may be a liquid (such as water, drilling fluid, ocean water, or a combination), a gas (such as air, nitrogen, oxygen, argon, or a combination), or a combination. Thus, pump 46 may be a gas pump or a liquid pump. Pump 46 may be connected to any appropriate fluid source. In some embodiments, the fluid source may be a defined reservoir (such as a gas or liquid tank) or an intake vent/hose (such as an air vent or an ocean water intake hose). In some embodiments, the fluid may be directed into interior area 15 with or without additional pressurization.

As pump 46 pushes air into interior area, the air applies pressure within interior area 15 and causes spoolable liner 10 to expand. As spoolable liner 10 expands, spoolable liner 10 is pushed against interior wall 92 of tube 90.

Figure 11:
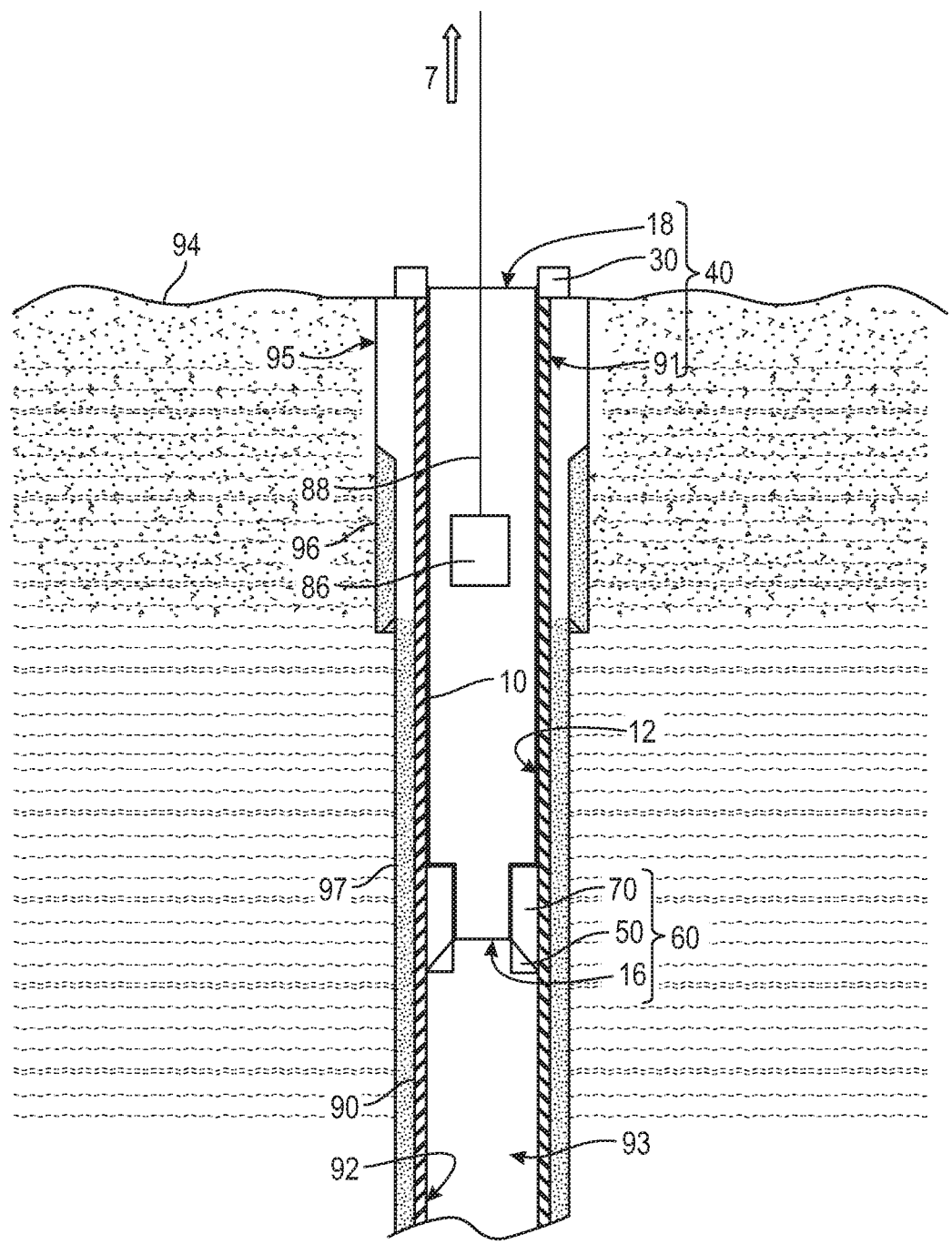
FIG. 11 depicts a schematic of an embodiment of a tube lined by a spoolable liner.

FIG. 11 shows spoolable liner 10 fit tightly against interior wall 92 of tube 90 from proximal connection 40 to distal connection 60.

Termination body 35 has been removed from proximal section 91 of tube 90 prior to FIG. 11. Termination collar 30 remains to connect spoolable liner 10 to tube 90. Termination collar 30 does not block fluid flow from interior 93 of tube 10, through interior 14 of spoolable liner 10, and out above surface 94. Thus, the termination no longer plugs interior 14 of spoolable liner 10 near proximal end 18.

Further, removable stopper 86 is removed from tube 90 via tether 88, as depicted by arrow 7. The removal of removable stopper 86 from tube 90 may be termed POOH.

In some embodiments, deployable plug may be removed by other means, such as by dissolving, chemically etching, deflating, melting, drilling, or retracting a plug deployed from another downhole component (like mandrel 50 or landing nipple 70).

Returning to FIG. 1, which depicts tube 90 after removal of termination body 35 and removable stopper 86. To that end, interior 14 of spoolable liner 10 is fluidly connected to interior 93 of tube 90 and to surface 94. Furthermore, interior wall 92 of tube 90 has been tightly lined with spoolable liner 90 from proximal connection 40 to distal connection 60.

Figure 12:
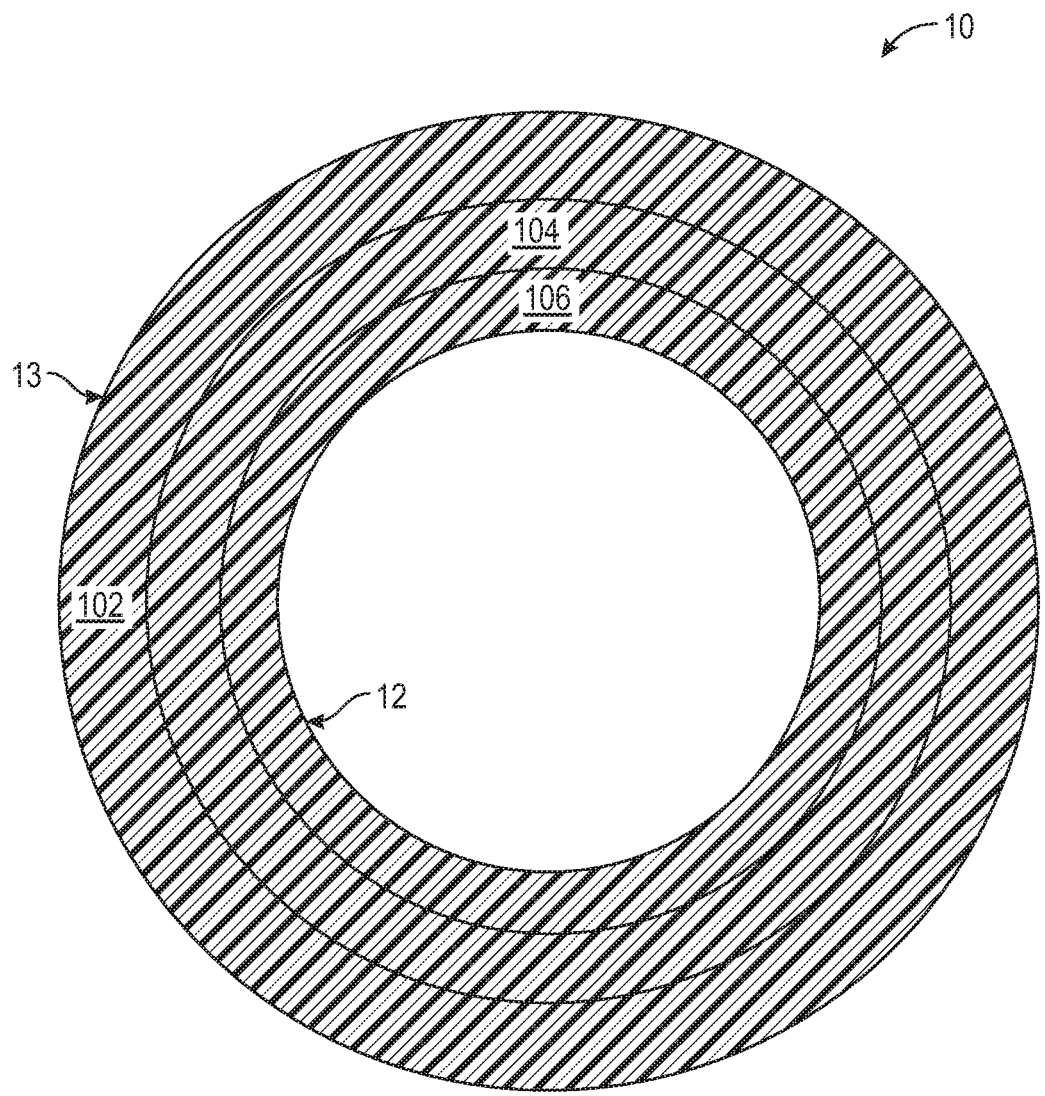
FIG. 12 depicts a schematic of an embodiment of a spoolable liner for lining a tube.

FIG. 12 depicts spoolable liner 10 with interior wall 12 and an exterior wall 13 indicated. Spoolable liner 10 is a hollow tube formed from a flexible material.

In some embodiments, spoolable liner 10 may be a layered polymer composite. As depicted here, spoolable liner 10 may include an inner liner 106 (toward interior wall 12), a core 104, and an outer layer 102 (toward exterior wall 13).

In some embodiments, inner liner 106 may be at least one of polyvinylidene fluoride, polyvinylidene difluoride, and polyetheretherketone. In some embodiments, core 104 may comprise tightly woven aramid fibers. In some embodiments, outer layer 102 may be a thermoplastic polyurethane.

In some embodiments, spoolable liner 10 may be essentially liquid impermeable, gas impermeable, or both. In some embodiments, spoolable liner 10 may be formed of one or more materials particular selected to resist corrosion, reaction, degradation, or other adverse reactions when exposed to a specific fluid or fluid mixture, such as production fluids. In some embodiments, spoolable liner 10 may be chemically resistant to corrosion, reaction, degradation, or other adverse reactions caused by production fluids.

Figure 13:
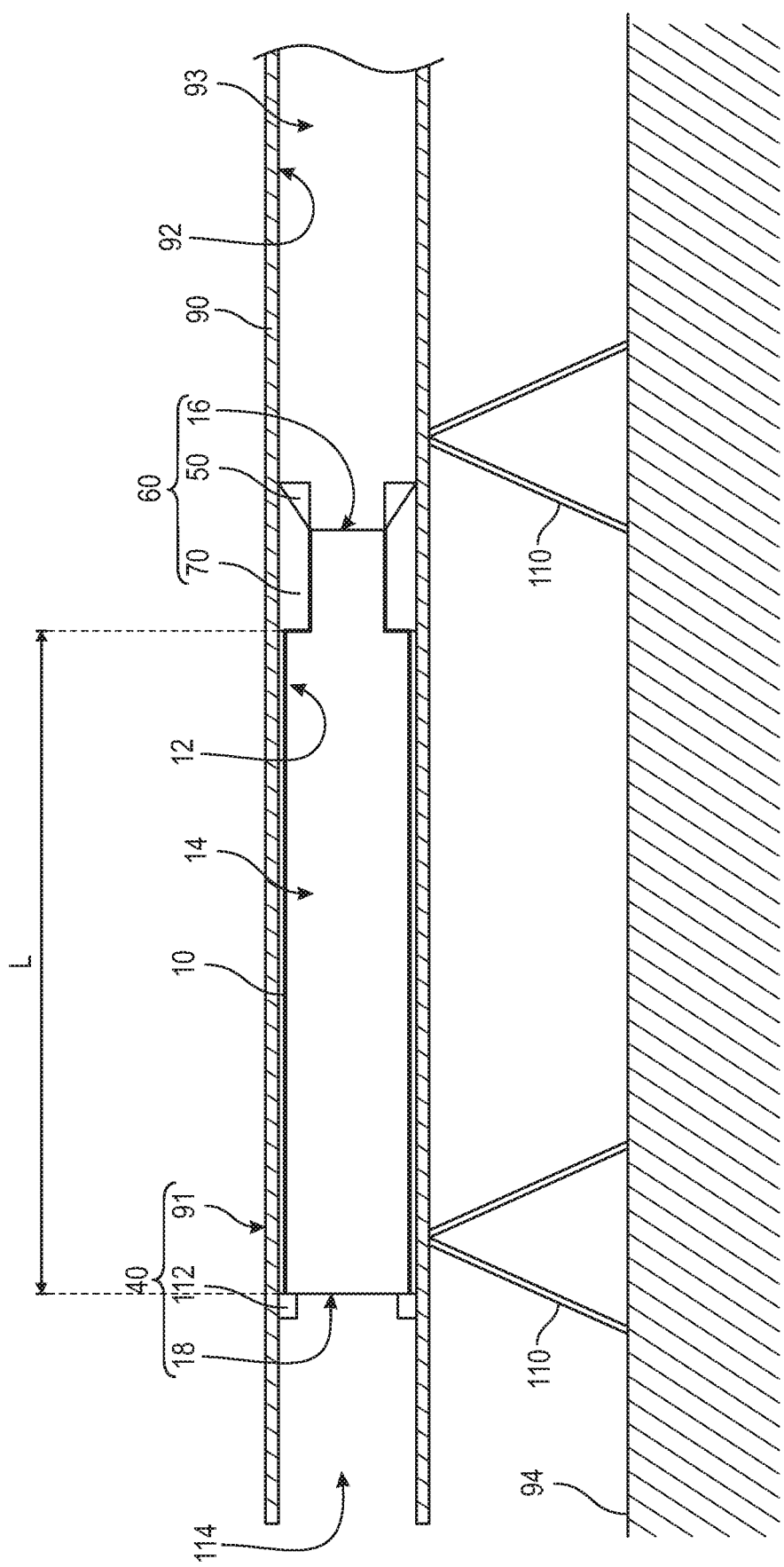
FIG. 13 depicts a schematic of an embodiment of a tube lined by a spoolable liner.

FIG. 13 depicts an alternative embodiment where tube 90 is not within a well (FIG. 1), but instead extends roughly horizontal along surface 94. Tube 90 rests on legs 110.

Also, FIG. 13. depicts an embodiment where proximal connection 40 is not adjacent to opening 114 of tube 90. Instead, proximal connection 40 is formed between proximal section 91 of tube 90, proximal end 18 of spoolable liner 10, and a termination connector 112.

Termination connector 112 may be any intermediate structure within interior 94 of tube 10 that may serve as a connection point between proximal section 91 of tube 90 and proximal end 18 of spoolable liner 10. In some embodiments, termination connector 112 may be a second landing nipple or a second mandrel connected to a second landing nipple, or any other appropriate structure. Furthermore, termination connector 112 may be a direct connection between proximal section 91 of tube 90 and proximal end 18 of spoolable liner 10, such as with an adhesive.

Landing nipple 70 within tube 90 is again at a tube engagement point. Here, tube engagement point is a tube engagement length L away from proximal connection 40 and proximal section 91 of tube 90.

One having skill in the art will appreciate that advancing various components within tube 10 may not benefit from gravity, as they may have in the embodiment depicted in FIG. 1. Consequently, in some embodiments, an active conveyance device (such as tractor 80) may be required to advance and position both mandrel 50 and deployable plug (such as removable stopper 86).

Figure 14:
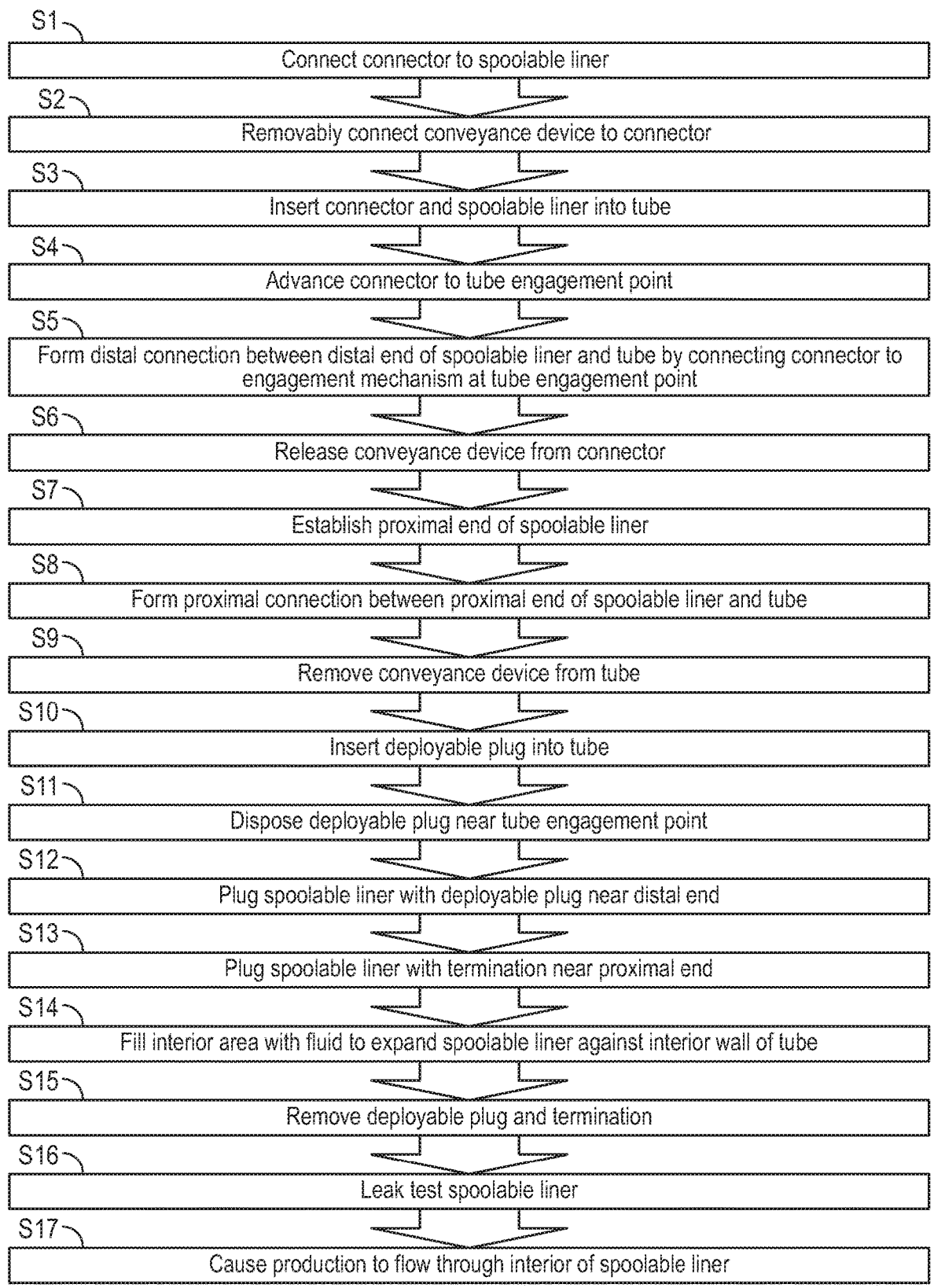
FIG. 14. depicts a flow chart of an embodiment of a method for lining a tube with a spoolable liner.

FIG. 14 is a flowchart depicting a method for lining tube 90 with spoolable liner 10. Not all depicted steps may be performed in all embodiments of this method.

Step S1 is connecting connector (like mandrel 50) to distal end 16 of spoolable liner 10. Such connection may be formed as discussed previously. An embodiment of step S1 may be seen in FIG. 2.

Some embodiments of the method may include step S2. Step S2 is removably connecting conveyance device (like tractor 80) to connector (like mandrel 50). Consequently, conveyance device (like tractor 80) is indirectly attached to distal end 16 of spoolable liner 10. Some embodiments of step S2 may be seen in FIG. 3. Some embodiments may not utilize a conveyance device, thus step S2 may not be performed in some embodiments.

Some embodiments of the method may not include step S2, such as those without a conveyance device.

Step S3 is inserting connector (like mandrel 50) and distal end 16 of spoolable liner 10 into proximal section 91 of interior 93 of tube 90.

In some embodiments, connector (like mandrel 50) and distal end 16 of spoolable liner 10 are connected to conveyance device (like tractor 80). Thus, in some embodiments, conveyance device (like tractor 80), connector (like mandrel 50), and distal end 16 of spoolable liner 10 are all inserted into proximal section 91 of interior 93 of tube 90. FIG. 4 may depict the results of one such embodiment of step S3.

Step S4 is advancing connector (like mandrel 50) within tube 80 to the tube engagement point. In some embodiments, the tube engagement point may be tube engagement depth D (FIG. 1) or tube engagement length L (FIG. 13).

In some embodiments, connector (like mandrel 50) and distal end 16 of spoolable liner 10 are connected to conveyance device (like tractor 80). Thus, in some embodiments, conveyance device (like tractor 80) may be used to advance connector (like mandrel 50) and distal end 16 of spoolable liner 10 to the tube engagement point. One such an embodiment of step S4 may be seen in FIG. 4.

Step S5 is forming distal connection 60 between distal end 16 of spoolable liner 10 and tube 90 by connecting connector (like mandrel 50) to engagement mechanism (like landing nipple 70) at tube engagement point (like tube engagement depth D or tube engagement length L). Some embodiments of step S2 may be seen in FIG. 5.

Some embodiments of the method may include step S6. Step S6 is releasing conveyance device (like tractor 80) from connector (like mandrel 50). One such an embodiment of step S6 just after the release of tractor 80 from mandrel 50 may be seen in FIG. 5.

In some embodiments, step S6 may occur after connector (like mandrel 50) has been connected to the engagement mechanism (like landing nipple 70).

Some embodiments of the method may not include step S6, such as those without a conveyance device.

Step S7 is establishing proximal end 18 of spoolable liner 10. In some embodiments, establishing proximal end 18 of spoolable liner 10 may involve locating an existing proximal end 18 on spool 11 as discussed previously.

In some embodiments, as detailed previously and as depicted in FIG. 6, establishing the proximal end may involve cutting spoolable liner 10 in a vicinity of proximal section 91 of tube 90.

Step S8 is to form proximal connection 40 between proximal end 18 of spoolable liner 10 and tube 10. Proximal connection 40 may take multiple forms as discussed previously and FIG. 6 depicts an embodiment of step S8 where proximal connection 40 involves proximal section 91 of tube 10, proximal end 18 of spoolable liner 10, and termination collar 30. In some embodiments, proximal connection 40 may be formed when termination collar 30 indirectly connect proximal section 91 of tube 10 to proximal end 18 of spoolable liner 10.

Alternatively, as detailed previously and depicted in FIG. 13, proximal connection 40 may include joining proximal end 18 of spoolable liner 10 to another component, including a wellhead (not depicted), surface 94, proximal section 91 of tube 10, or terminal connector 112 (not located adjacent to opening 114 of tube 90).

Some embodiments of the method may include step S9. Step S9 may be removing conveyance device (like tractor 80) from tube 90. An embodiment of step S9 may be seen in FIG. 7. Here, tractor 80 is being withdrawn using slickline 84.

Some embodiments of the method may not include step S9, such as those without a conveyance device.

Additionally, as discussed previously, step S9 involving the removal of conveyance device (like tractor 80) may occur later in the method. In some embodiments, conveyance device (like tractor 80) advances both connector (such as mandrel 50) and deployable plug (such as removable stopper 86). In some embodiments, conveyance device (like tractor 80) may serve as deployable plug. In such embodiments, step S9 may occur later, such as after step S14 (discussed further).

Some embodiments of the method may include step S10. Step S10 may be inserting deployable plug (such as removable stopper 86) into tube 10. FIG. 8 depicts an embodiment where step S10 has occurred. Here, removable stopper 86 was inserted using tether 88.

Some embodiments of the method may not include step S10. As discussed previously, some embodiments of the method may not require inserting an additional component to serve as a deployable plug, such as when deployable plug is a component within tractor 80, mandrel 50, or landing nipple 70 or when deployable plug is carried by tractor 80.

Some embodiments of the method may include step S11. Step S11 may be to dispose deployable plug (such as removable stopper 86) in a vicinity of or downflow from distal end 16 of spoolable liner 10. An embodiment of step S1*l* may be seen in FIG. 8. Here, removable stopper 86 is being positioned using tether 88.

Some embodiments of the method may not include step S11. As discussed previously, some embodiments of the method may not require positioning an additional component to serve as a deployable plug, such as when deployable plug is a component within tractor 80, mandrel 50, or landing nipple 70.

Step S12 may be plugging interior 14 of spoolable liner 10 with deployable plug (such as removable stopper 86) in a vicinity of or downflow from distal end 16. An embodiment of step S12 is shown in FIG. 8 with spoolable liner 10 plugged with removable stopper 86 adjacent to landing nipple 70.

In one of more embodiments, step S12 may include positioning a removable stopper 86, activating another component (like tractor 80, mandrel 50, or landing nipple 70), inflating an inflatable stopper, causing a chemical reaction, or chemically or physically plugging spoolable liner 10 in some other manner in a vicinity of or downflow from distal end 16. These multiple embodiments of step S12 are discussed previously.

Step S13 may be plugging interior 14 of spoolable liner 10 with a termination in a vicinity of proximal end 18.

An embodiment of step S13 is shown in FIG. 9. In the embodiment depicted in FIG. 9, the termination includes termination body 35 and termination collar 30. Together, termination body 35 and termination collar 30 plug spoolable liner 10 in a vicinity of proximal end 18.

Step S14 may be filling interior area 15 with fluid to expand spoolable liner 10 against interior wall 92 of tube 90. FIG. 10 depicts an embodiment just prior to step S14, while FIG. 11 depicts an embodiment after step S14.

In the embodiment depicted in FIG. 10, pump 46 supplies the fluid to interior area 15. Further, the ambient environment serves as a fluid source. Specifically, pump 46 pumps air through hose 44 and aperture 42 in termination body 35. Aperture 42 provides selective access to interior area 15 for the air. In interior area 15, the air expands spoolable liner 10 against interior wall 92 of tube 90. Thus, spoolable liner 10 may fit tightly against interior wall 92 of tube 90 from proximal connection 40 to distal connection 60.

As discussed previously, alternative fluids and fluid sources may be employed in one or more embodiments of step S14.

Some embodiments of the method may include step S13. Step S15 may be removal of deployable plug and termination.

FIG. 11 depicts after termination body 35 has been removed according to step S15. However, termination collar 30 is maintained to connect spoolable liner 10 to tube 90. Termination collar 30 does not block fluid flow from interior 93 of tube 10, through interior 14 of spoolable liner 10, and out above surface 94. Thus, the termination no longer plugs interior 14 of spoolable liner 10 near proximal end 18.

Further, FIG. 11 depicts an embodiment of step S15 where removable stopper 86 is removed using tether 88.

As discussed previously, removal of deployable plug may take alternative forms such as by dissolving, chemically etching, deflating, melting, drilling, or retracting a plug deployed from another downhole component (like mandrel 50 or landing nipple 70) in one or more embodiments.

Also, in one or more embodiments, removal of deployable plug may also be removal of conveyance device (like tractor 80) as discussed previously.

Some embodiments of the method may include step S16. Step S16 may be leak testing spoolable liner 10, distal connection 60, and proximal connection 40.

In some embodiments, after lining tube 90 with spoolable liner 10, spoolable liner 10, proximal connection 40, and distal connection 60 may be leak tested. Such leak testing may be performed by flowing a testing fluid through interior 14 of spoolable liner 10, and checking for leaks of the test fluid.

In some embodiments, leak testing may preceded production flow through interior 14 of spoolable liner 10.

Some embodiments of the method may include step S17. Step S17 may be causing production to flow through interior 14 of spoolable liner 10.

In some embodiments, as depicted in FIG. 1, production may production may originate downflow from distal connection 60, flowing from interior 93 of tube 90, through distal connection 60, interior 14 of spoolable liner 10, and proximal connection 40, and exit tube 90 above surface 94 to be collected as well known in the art and as disclosed elsewhere.

In some embodiments, as depicted in FIG. 13, production may originate downflow from distal connection 60, flowing from interior 93 of tube 90, through distal connection 60, interior 14 of spoolable liner 10, and proximal connection 40, and continue through interior 93 of tube 90 upflow from proximal connection 40. In some embodiments, production may instead flow from proximal connection 40 toward distal connection 60.

After tube 90 has been lined with spoolable liner 10, interior wall 12 of tube 90 may be corrosion protected. In some embodiments, spoolable liner 10 may be deployed to protect interior wall 12 of tube 90 from corrosion caused by production fluids or other corrosive fluids.

In some embodiments, the method described here may be performed on tube 90 that has or has not been previously exposed to production fluids. In some embodiments, production flow through tube 90 may need to be stopped or significantly limited prior to being lined with spoolable liner 10 according to this method. Stopping or limiting production flow through tube 90 may be performed according to methods well known in the art and documented elsewhere.

In some embodiments, tube 90 may be lined with spoolable liner 10 to remediate corrosion damage to interior wall 92 of tube 90. Thus, spoolable liner 10 may be deployed to prevent additional corrosion damage to interior wall 92 of tube 90 in some embodiments.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method of lining a tube using a spoolable liner, the method comprising:
    connecting a connector to a distal end of the spoolable liner arranged on a spool;
    inserting the connector and the spoolable liner into an opening of the tube and advancing the connector to a tube engagement point connected to an interior wall of the tube;
    forming a distal connection between the spoolable liner and the tube by attaching the connector to an engagement mechanism at the tube engagement point;
    establishing a proximal end of the spoolable liner;
    forming a proximal connection between the proximal end of the spoolable liner and the tube;
    inserting a deployable plug into the spoolable liner within the tube and advancing the deployable plug to the distal connection;
    plugging the spoolable liner with the deployable plug at the distal connection;
    plugging the spoolable liner with a termination at the proximal connection; and
    filling an interior area defined by an interior of the spoolable liner, the termination, and the deployable plug, with a fluid through an aperture of the termination such that the fluid expands the spoolable liner into contact with the interior wall of the tube between the distal connection and the proximal connection.

2. The method of claim 1, wherein the spoolable liner is liquid impermeable such that the spoolable liner corrosion protects the interior wall of the tube between the distal connection and the proximal connection.

3. The method of claim 1, further comprising:
    removing the deployable plug and the termination; and
    causing production to flow through the interior of the spoolable liner.

4. The method of claim 1, further comprising:
    removably connecting a conveyance device to the connector;
    using the conveyance device to advance the spoolable liner to the tube engagement point;
    releasing the conveyance device from the connector after the connector has been connected to the engagement mechanism; and
    removing the conveyance device from the tube.

5. The method of claim 4, wherein the conveyance device comprises a tractor.

6. The method of claim 1, further comprising:
    leak-testing the spoolable liner, the distal connection, and the proximal connection by flowing a testing fluid through the interior of the spoolable liner.

7. The method of claim 1, wherein forming the proximal end of the spoolable liner comprises:
    cutting the spoolable liner in a vicinity of a proximal section of the tube.

8. The method of claim 1, wherein forming the proximal connection comprises:
    clamping the proximal end of the spoolable liner to a vicinity of the proximal section of the tube with a termination collar.

9. The method of claim 1, wherein the fluid comprises at least one of air, nitrogen, oxygen, and argon.

10. The method of claim 1, wherein the tube is a well casing where the distal connection is formed below a surface and the proximal connection is formed in a vicinity of the surface.

11. The method of claim 10, wherein the proximal connection connects the proximal end of the spoolable liner to a wellhead of the well.

12. A system for lining a tube, the system comprising:
    a hollow, flexible, spoolable liner having a distal end arranged on a spool;
    a connector configured to be attached to the distal end of the spoolable liner, to be inserted into an opening of the tube along with the distal end of the spoolable liner, and to engage with an engagement mechanism at a tube engagement point connected to an interior wall of the tube forming a distal connection;
    a deployable plug sized to seal the spoolable liner at the distal connection and configured to be inserted into the spoolable liner within the tube and advanced to the distal connection;
    a termination configured to secure the proximal end of the spoolable liner to a proximal section of the tube forming a proximal connection and sized to seal the spoolable liner at the proximal connection, wherein the termination comprises an aperture providing fluidic connection to an interior area defined by an interior of the spoolable tube, the deployable plug, and the termination; and
    a fluid source selectively engageable with the interior area via the aperture of the termination to expand the interior of the spoolable liner into contact with the interior wall of the tube between the distal connection and the proximal connection.

13. The system of claim 12, wherein the spoolable liner is liquid impermeable such that the spoolable liner corrosion protects the interior wall of the tube between the distal connection and the proximal connection.

14. The system of claim 12,
    wherein the spoolable liner comprises an inner liner, a core, and an outer layer;
    wherein the inner liner comprises at least one of polyvinylidene fluoride, polyvinylidene difluoride, and polyetheretherketone;
    wherein the core comprises tightly woven aramid fibers; and wherein the outer layer comprises a thermoplastic polyurethane.

15. The system of claim 12, wherein the engagement mechanism comprises a landing nipple.

16. The system of claim 12, wherein the connector comprises a mandrel.

17. The system of claim 12,
wherein the deployable plug comprises a removable stopper.

18. The system of claim 12, wherein the proximal end of the spoolable liner is attached in a vicinity of the proximal section of the tube by a termination collar.

19. The system of claim 12, wherein the tube is a well casing with the distal end below a surface and the proximal end in a vicinity of the surface.

20. The system of claim 19, wherein the proximal connection connects the proximal end of the spoolable liner to a wellhead of the well.

* * * * *